April 21, 1964                R. H. BOLTON                3,129,593
ANISOELASTICITY COMPENSATOR FOR GYROSCOPIC INSTRUMENTS
Filed Oct. 27, 1961
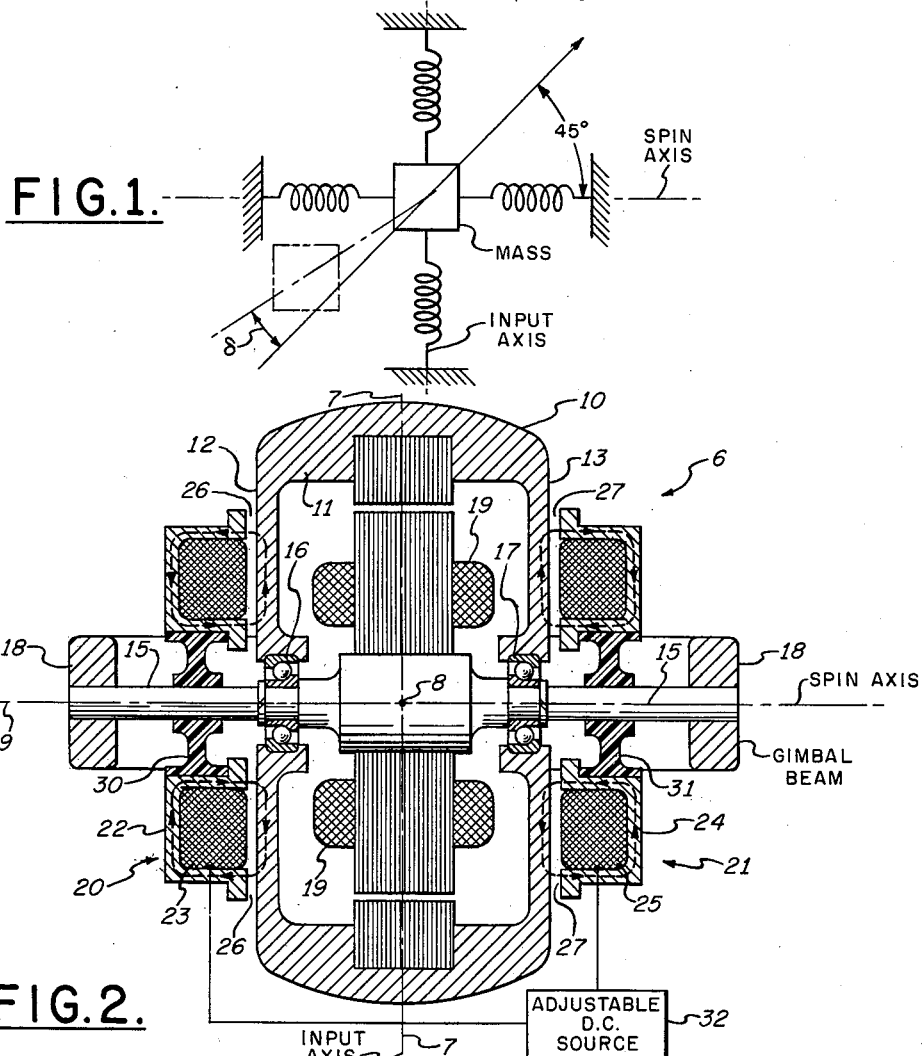
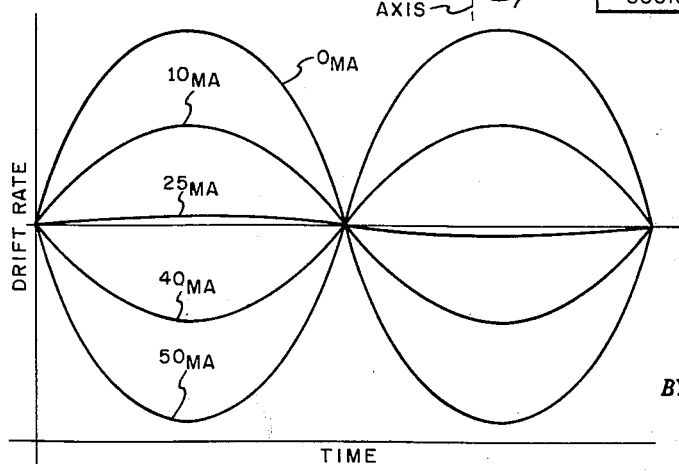
FIG.3.
INVENTOR.
ROBERT H. BOLTON
BY
ATTORNEY ited States Patent Office 3,129,593
Patented Apr. 21, 1964

3,129,593
ANISOELASTICITY COMPENSATOR FOR
GYROSCOPIC INSTRUMENTS
Robert H. Bolton, Huntington, N.Y., assignor to Sperry
Rand Corporation, Great Neck, N.Y., a corporation of
Delaware
Filed Oct. 27, 1961, Ser. No. 148,063
2 Claims. (Cl. 74—5)

The present invention relates to an anisoelasticity compensator for gyroscopic instruments.

A gyroscopic rotor is constructed to be symmetrical both about the axis of rotation and about a plane normal to the rotor axis and bisecting said rotor. It can be seen that if the rotor was perfectly rigid it would not deform in response to acceleration. However, since it is elastic, some deformation necessarily occurs when the rotor is subjected to linear acceleration. If the rotor material has anisoelastic or unequal elastic properties which are directional in nature; i.e. if more deformation occurs in one direction than in another, the result will be that the center of gravity will shift out of the line of action of the acceleration, producing a moment or torque equal to the product of the distance of shift from said line of action, the mass of the rotor, and the acceleration. Although the magnitude of this quantity is small, its importance cannot be overlooked since the imposition of any torques upon the gyro rotor in directions not corresponding to the spin axis of the rotor decreases the precision attainable by the gyroscope. Since it is impossible to construct a gyroscope which is absolutely rigid, it is desirable to construct it to be isoelastic, i.e. to have elastic properties which are in all directions the same.

Normally, the thin web portion of a gyroscopic rotor has less stiffness, i.e. is more elastic, than the enlarged rim portion. To increase the stiffness of the web portion and thereby render it less deformable to accelerations parallel to the gyro spin axis, the web portion is prestressed by applying a force known as a preload to the rotor bearings. Preloading the rotor bearings increases the resistance of the gyro to further deflection in the axial direction when subjected to accelerations in that direction. The preload is applied to the rotor bearings in accordance with drift test data of the particular gyro rotor. Mechanical methods of applying a preload are relatively crude and require extensive trial and error techniques by experienced personnel. Adjusting the preload mechanically in accordance with gyro drift test data requires operating the gyro to obtain drift test data, disassembling the gyro to make the mechanical preload adjustment, reassembling the gyro, and retesting. These steps are repeated until the drift test data is acceptable. Further, severe damage may result to the gyro if the preload is carelessly adjusted.

The present electrical anisoelasticity compensator is far superior since it is continuously adjustable during the gyro drift test by means external to the gyro by inexperienced personnel. The present invention precludes the possibility of damaging the gyro while adjusting the preload as there are no mechanical parts to wear, slide or bind. Further the electrical adjustment can be made extremely fine to provide appreciably greater accuracy.

It is a primary object of the present invention to provide an anisoelasticity compensation means for gyroscopic instruments which tends to make the gyroscopic instrument isoelastic.

It is an additional object of the present invention to provide an adjustable electrical anisoelasticity compensation means for gyroscopic instruments which tends to accurately render the gyroscopic instrument isoelastic.

The above objects are achieved in the present invention by mounting first and second spaced electromagnets to be cooperative with first and second web portions respectively of the gyroscopic rotor. First and second spaced ball bearings are rotatably connected to the first and second web portions respectively for rotatably supporting the rotor for spinning around its spin axis. The preload on the first and second spaced ball bearings is adjusted by varying the current through the electromagnets to thereby compensate for the anisoelasticity of the gyroscope along the spin axis with respect to its input axis.

Referring now to the drawings,

FIG. 1 is a schematic diagram illustrating the principle of anisoelasticity as applied to a gyroscope;

FIG. 2 is a schematic sectional view of a gyroscope including the present invention; and FIG. 3 is a graph of drift rate versus time with varying amounts of current through the electromagnets of the present invention.

In gyroscopes used for high precision inertial guidance, the anisoelasticity coefficient is extremely important particularly when the system is subjected to extreme vibrations and sustained acceleration. Referring to FIG. 1, if the springs along the spin axis are not equal in compliance or isoelastic with respect to the springs along the input axis, the displacement of the center of the mass will not be collinear with the acceleration vector in the presence of an acceleration. The center of the mass will be displaced an amount $\delta$ depending upon the acceleration experienced. As a result of this anisoelastic effect, a torque T will appear about the output axis of the gyroscope resulting in an angular drift. The more the springs along one axis vary in compliance with respect to those along another axis the greater is the displacement $\delta$ for a given acceleration. The torque T is equal to the mass M times the acceleration A times the displacement $\delta$. Thus, reducing the displacement $\delta$ by compensating for anisoelasticity proportionately reduces the torque T for a given mass and acceleration.

The angular drift rate $\omega = KG^2$ where $\omega$ is the angular drift rate in degrees per hour, K is the anisoelasticity coefficient in degrees per hour per $G^2$, and G is the applied acceleration in G's. It will be seen that decreasing the anisoelasticity coefficient K proportionally decreases $\omega$ for a given acceleration. The anisoelasticity coefficient K is effected by preload, curvature and contact angle. The present invention decreases the anisoelasticity of the gyroscope by electrically varying the preload.

A gyroscope 6 is shown in FIG. 2 which has an input axis 7, an output axis 8 perpendicular to the plane of the paper and a spin axis 9. The gyroscope 6 has a gyroscopic rotor 10 having an enlarged rim portion 11 and first and second spaced web portions 12 and 13 respectively. The rotor 10 is mounted for rotation around its spin axis 9 on a shaft 15 by means of first and second spaced ball bearings 16 and 17 respectively. The shaft 15 has its longitudinal axis coincident with the spin axis 9. The shaft 15 in turn is mounted on a gimbal 18. The rotor 10 is driven by means of motor elements 19 mounted on the shaft 15 and energized in a conventional manner not shown.

In accordance with the present invention first and second spaced annular electromagnets 20 and 21 are coaxially mounted on the shaft 15 and adjacent to respective web portions 12 and 13 thereby forming air gaps 26 and 27 respectively therebetween. The annular electromagnet 20 includes an annular ferromagnetic material 22 which houses an annular electrical coil 23. Similarly, the annular electromagnet 21 includes an annular ferromagnetic material 24 which houses an annular electrical coil 25. While the electromagnets 20 and 21 are mounted on the shaft 15, they are electrically isolated therefrom by means of non-magnetic annular mounting members 30 and 31 respectively. The coils 23 and 25 are connected to a stable adjustable D.C. source 32.

The gyroscope 6 is initially designed to be substantially isoelastic but with a small amount of anisoelasticity in order to obtain a range of adjustments of preload on the ball bearings 16 and 17 in a manner to be explained.

In operation, the D.C. source 32 energizes the coils 23 and 25 and the current flow therethrough creates a magnetic flux path indicated by the arrows which tends to attract the web portions 12 and 13 towards the electromagnets 20 and 21 respectively. This tends to pull the web portions 12 and 13 outwardly thereby reducing the preload on the bearings 16 and 17. The magnetic path as shown in dotted lines with respect to the electromagnet 20 is through the ferromagnetic housing 22, across the air gaps 26 and through a small section of the web portion 12. Similarly, the magnetic path through the electromagnet 21 is through the ferromagnetic housing 24, across the air gaps 27 and a small section of the web portion 13.

As the current from the D.C. source 32 is increased, the magnetic flux density is increased thereby increasing the attractive force on the web portions 12 and 13 and reducing the preload on the bearings 16 and 17. Decreasing the current through the coils 23 and 25 decreases the flux density thereby increasing the preload on the bearings 16 and 17. To obtain the desired range of adjustment, a nominal amount of anisoelasticity must be built into the gyroscope 6, i.e. the bearings 16 and 17 must have an initial preload slightly greater than that required for an isoelastic assembly. This is necessary since it is virtually impossible to construct a gyroscope that is truly isoelastic in the absence of the present invention.

In order to compensate for the anisoelasticity of the gyroscope 6, the assembled gyroscope 6 is tested to determine its drift rate which as explained previously is a function of its anisoelasticity. With zero current through the coils 23 and 25, the drift rate in terms of degrees °/hr./$G^2$ versus time may be as shown by the sinusoidal line labelled $0_{MA}$ in FIG. 3. By exciting the coils 23 and 25 with a current of 10 ma., the drift rate may be reduced as shown by the line labeled $10_{MA}$. In order to reduce the drift rate to the lowest possible value, the current is increased from the D.C. source 32 until the sinusoidal drift rate curve flattens almost to a straight line as shown by the line labelled $25_{MA}$ in FIG. 3, for example.

During further operation of the gyroscope 6 in its normal environment, the coils 23 and 25 are continuously provided with a 25 ma. current, for example, by the D.C. source 32 in order that the attractive force of the electromagnets 20 and 21 on the web portions 12 and 13 respectively maintain the preload on the bearings 16 and 17 at a value which compensates for the anisoelasticity along the spin axis 9 with respect to the input axis 7. This renders the gyroscope 6 substantially isoelastic thereby providing a gyroscopic instrument having an extremely low drift rate suitable for precise inertial guidance application.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A gyroscope that is subject to anisoelastic effects having input, output and spin axes comprising a rotor having an enlarged rim portion and first and second web portions, first and second spaced ball bearing means cooperative with said first and second web portions of said rotor for rotatably supporting said rotor for spinning around said spin axis, said first and second ball bearing means having an initial preload, first and second electromagnet means cooperative with said first and second web portions and said first and second ball bearing means respectively and adapted to adjust said preload to render the elasticity of said gyroscope with respect to said spin axis substantially equal to that with respect to said input axis by exerting first and second forces on said first and second web portions respectively, said first and second forces being equal in magnitude and opposite in direction with respect to each other, and adjustable means for varying the energization of said first and second electromagnet means for adjusting said first and second forces whereby to render said gyroscope substantially isoelastic with respect to said input and spin axes.

2. A gyroscope that is subject to anisoelastic effects having input, output and spin axes comprising a rotor having an enlarged rim portion and first and second spaced web portions, said web portions being of a ferromagnetic material, a shaft having its longitudinal axis coincident with said spin axis for supporting said rotor, first and second spaced ball bearings mounted on said shaft and cooperative with said first and second web portions respectively for supporting said rotor for spinning around said spin axis, said first and second ball bearings have an initial preload, first and second spaced annular electrical coils coaxially mounted on said shaft to form first and second annular electromagnets that are electrically isolated from said shaft, said first and second electromagnets being cooperative with said first and second web portions respectively and adapted to apply first and second forces thereto respectively in accordance with the current through said coils to thereby adjust the preload on said first and second ball bearings, said forces being equal in magnitude and opposite in direction with respect to each other, and an adjustable current source connected to said coils for varying the current through said coils for adjusting said first and second forces to render the elasticity of said gyroscope along said spin axis substantially equal to that along said input axis.

References Cited in the file of this patent

UNITED STATES PATENTS

| 2,771,778 | Ryberg | Nov. 27, 1956 |
| 2,822,694 | McKenney | Feb. 11, 1958 |